`US008179585B2`

(12) United States Patent
Nagase et al.

(10) Patent No.: US 8,179,585 B2
(45) Date of Patent: May 15, 2012

(54) COUPLED QUANTUM WELL STRUCTURE

(75) Inventors: Masanori Nagase, Tsukuba (JP);
Ryoichi Akimoto, Tsukuba (JP);
Hiroshi Ishikawa, Tsukuba (JP)

(73) Assignee: National Institute of Advanced Industrial Science and Technology (JP)

( * ) Notice: Subject to any disclaimer, the term of this patent is extended or adjusted under 35 U.S.C. 154(b) by 566 days.

(21) Appl. No.: 12/377,481

(22) PCT Filed: Aug. 17, 2007

(86) PCT No.: PCT/JP2007/066013
§ 371 (c)(1),
(2), (4) Date: Feb. 13, 2009

(87) PCT Pub. No.: WO2008/020621
PCT Pub. Date: Feb. 21, 2008

(65) Prior Publication Data
US 2010/0245969 A1    Sep. 30, 2010

(30) Foreign Application Priority Data
Aug. 17, 2006 (JP) .................. 2006-222736

(51) Int. Cl.
*G02F 1/03* (2006.01)
*G02F 1/00* (2006.01)
*G02B 6/10* (2006.01)
*H01L 29/06* (2006.01)

(52) U.S. Cl. ........ 359/244; 359/248; 359/321; 385/131; 257/14

(58) Field of Classification Search .......... 359/244, 359/240, 245, 248, 250–252, 255, 256, 315, 359/321; 385/14, 122, 129–131, 2; 372/45.01, 372/45.011, 7, 11, 18, 43, 45, 48, 68, 75; 257/18, 14–15, 189, 622–623
See application file for complete search history.

(56) References Cited

U.S. PATENT DOCUMENTS

| 5,023,879 A | 6/1991 | Wang et al. |
| 2002/0096675 A1* | 7/2002 | Cho et al. ................... 257/25 |

(Continued)

FOREIGN PATENT DOCUMENTS

JP    2000-089270    3/2000
(Continued)

OTHER PUBLICATIONS

International Search Report dated Nov. 20, 2007, issued in corresponding international application No. PCT/JP2007/066013.

(Continued)

*Primary Examiner* — Dawayne A Pinkney
(74) *Attorney, Agent, or Firm* — Ostrolenk Faber LLP (57) ABSTRACT

In the production of optical devices or the like utilizing an intersubband transition of a coupled quantum well, a quantum well structure having strong coupling is provided. In addition, a coupled well structure of excellent productivity capable of avoiding thinning of coupling barrier layer for strengthening the coupling is provided. In the semiconductor coupled well structure of the present invention, a coupled quantum well structure disposed on the semiconductor single crystal substrate includes a coupling barrier layer 1a disposed between two or more quantum well layers 2a and 2b, wherein the coupling barrier layer 1a has an energy barrier that is smaller than an excitation level ($E_4$ and $E_3$) and is larger than a ground level ($E_2$ and $E_1$).

6 Claims, 6 Drawing Sheets

U.S. PATENT DOCUMENTS

2004/0173883 A1* 9/2004 Ohno et al. .................. 257/668

FOREIGN PATENT DOCUMENTS

JP             2003-329988            11/2003

OTHER PUBLICATIONS

Rabinovich, W.S. Beadie, G. Katzer, D.S., Intersubband X3 in coupled InGaAs-AlGaAs multiple quantum wells, IEEE Journal of Quantum Electronics vol. 34, Issue: 6, Jun. 1998, 975-981.

Hiroshi Ishikawa, "Chokosoku Hikari Device no Saishin Doko to Jisedai Photonic Network eno Oyo Jisedai Photonic Network-yo Chokosoku Hikari Switch", Optronics, Jun. 10, 2005, No. 282, 120-124.

Haruhiko Yoshida Takasi Simoyama Achanta Venu Gopal Jun-ichi Kasai Teruo Mozume Hiroshi Ishikawa, Ultrafast All-Optical Switching and Modulation Using Intersubband Transitions in Coupled Quantum Well Structures, IEICE Transactions on Electronics, Jul. 1, 2004, vol. E87-C No. 7, 1134-1141.

M. Naruse et al., "Ultrafast All-Optical NOR Gate Based on Intersubband and Interband Transitions", IEEE Photonics Technology Letters, vol. 17, No. 8, Aug. 2005, pp. 1701-1703.

T. Mozume et al., "Ultralow Intersubband Absorption Saturation Intensity at Communication Wavelength Achieved in Novel Strain Compensated InGaAs/AlAs/AlAsSb Quantum Wells Grown by Molecular Beam Epitaxy", Japanese Journal of Applied Physics, vol. 42, Part 1, No. 9A, Sep. 2003, The Japan Society of Applied Physics, pp. 5500-5507.

H. Tsuchida et al., "Cross-Phase-Modulation-Based Wavelength Conversion Using Intersubband Transition in InGaAs/AlAs/AlAsSb Coupled Quantum Wells", Optics Letters, vol. 32, No. 7, 2007 Optical Society of America, pp. 751-753.

R. Akimoto et al., "All Optical Demultiplexing from 160-40-Gb/s Utilizing InGaAs/AlAsSb Quantum Well Intersubband Transition Switch", Proceeding of 34th European Conference and Exhibition on Optical Communication, vol. 5, Sep. 21-25, 2008, Brussels, Belgium, pp. 57-58.

H. Ishikawa et al., "Ultrafast All-Optical Refractive Index Modulation in Intersubband Transition Switch using InGaAs/AlAs/AlAsSb Quantum Well", Japanese Journal of Applied Physics, vol. 46, No. 8, 2007, pp. L157-L160.

M. Nagase et al., "Intersubband Transitions in InGaAs/AlAsSb Coupled Double Quantum Wells with InAlAs Coupling Barriers", Proceedings of 2007 International Conference on Indium Phosphide and Related Materials, May 14-18, 2007, Matsue, Japan, pp. 502-505.

* cited by examiner

COUPLED QUANTUM WELL STRUCTURE

CROSS REFERENCE TO RELATED APPLICATIONS

The present application is a 35 U.S.C. §371 National Phase conversion of PCT/JP2007/066013, filed Aug. 17, 2007, which claims benefit of Japanese Application No. 2006-222736, filed Aug. 17, 2006. The PCT International Application was published in the Japanese language.

TECHNICAL FIELD

The present invention relates to a semiconductor coupled well structure for utilizing an intersubband transition in a conductive band.

BACKGROUND ART

Extensive researches and developments are carried out based on the recent development of crystal-growth technologies. Specifically, in accordance with the recent semiconductor crystal technologies, it is possible to form a hetero-boundary structure in the order of several nanometers. As a result, the wavelength of intersubband transition in a quantum well is decreased, realizing intersubband transition in an optical communication wavelength band.

In addition, the optical signal processing is superior to the electric signal processing with respect to a transmission speed, intersignal-interference, and electric power consumption. Therefore, as an alternative to conventional switches using electric signal processing, there is a strong demand for a practical all-optical switch that utilizes only the optical signal processing.

Conventionally, operation of an all-optical switch using intersubband transition in a conduction band has been confirmed. This all-optical switch utilizes change in an absorption coefficient generated by interband and intersubband optical absorptions. Further, as an evolved type, an all-optical switch utilizing both of intersubband transition and interband transition in a conduction band of a quantum well structure has been studied (Non Patent Reference 1).

Recently, there are advanced researches on the luminescence of ultraviolet light utilizing interband transition between a conduction band and a valence band in high band-gap materials such as GaN and oxide materials. Therefore, by combining the intersubband transition in infrared light, it is possible to realize an all-optical switch utilizing an infrared controlling light and ultraviolet signal light. Thus, realization of all-optical switches in a broad wavelength band can be expected.

An optical device that utilizes intersubband transition in a semiconductor quantum well has superiority in response speed compared with semiconductor optical devices that utilize interband transition or the like. Currently, most of semiconductor optical devices which are mass produced mainly utilize absorption by interband transition. Response speed of an optical switch and optical modulator of higher speed is controlled in switching-off time by interband recombination time (in the order of several nano-seconds) of real excited carriers.

On the other hand, intersubband transition in the conduction band of a semiconductor quantum well structure, relaxation time is not longer than several pico seconds, thereby enabling enhancement of switching-off speed to one thousand or higher times higher than that in the case of interband transition.

However, III-V group semiconductors such as InGaAs, GaAs, GaN or the like are currently used in semiconductor lasers for optical communication and optical recording. To achieve an intersubband transition in a wavelength band of optical communication utilizing such materials as a quantum well layer, there are difficulties in crystal-growth technique.

For example, in a strained quantum well of InGaAs/AlAs or a strained quantum barrier (on InP substrate) that have been already reported, it is required to extremely narrow the width of a quantum well to the order of several atomic layers.

Figure 2:
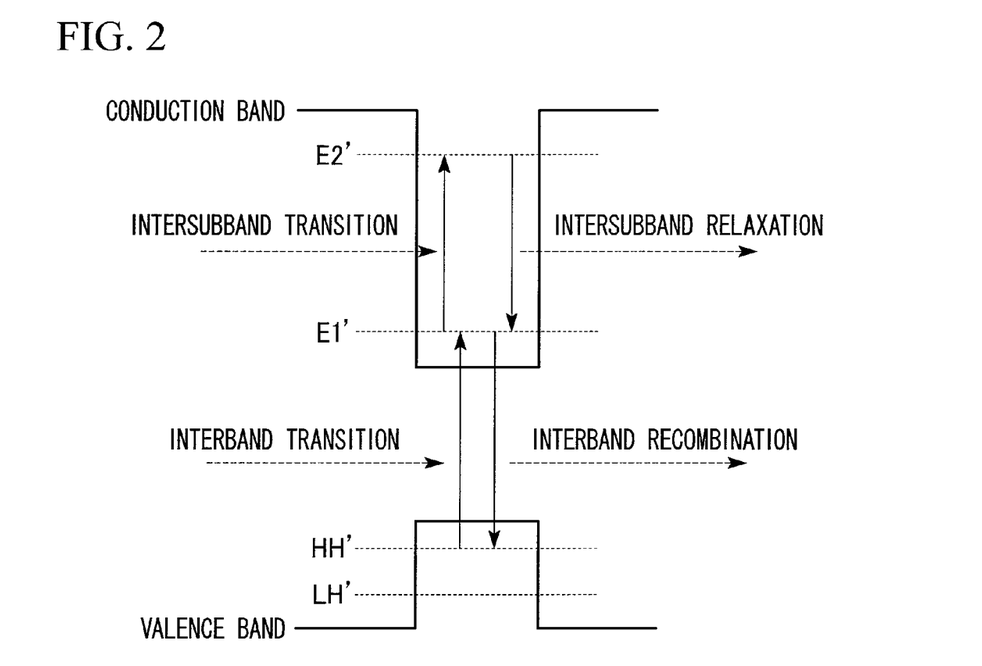
FIG. 2 is a graph showing an energy band structure of a single quantum well.
Figure 3:
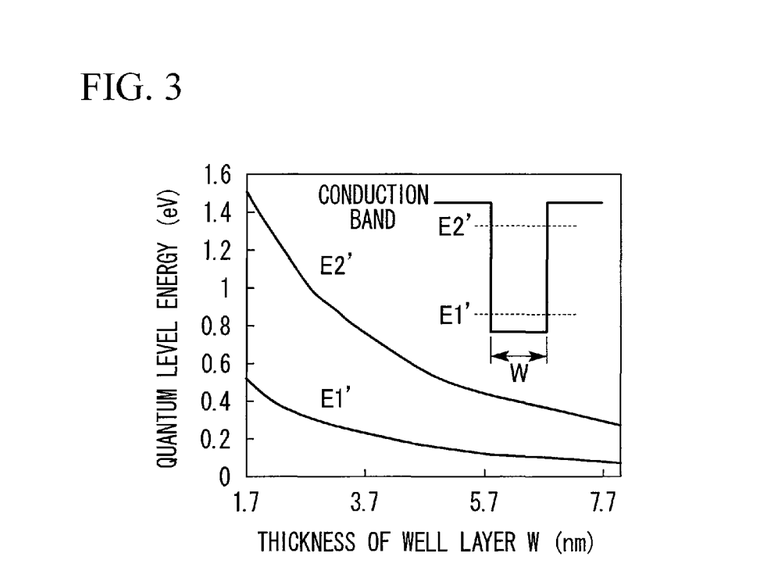
FIG. 3 is a graph showing a well-width dependence of intersubband transition energy in a single quantum well.

For example, FIG. 2 shows a single quantum well layer that has two quantum levels (subband: E1', E2'). In order to shorten the intersubband transition wavelength using such a single quantum well layer, it is necessary to narrow the quantum-well width. In this case, E1'-E2' intersubband transition has a well-width dependence as shown in FIG. 3. That is, intersubband energy increases and intersubband transition wavelength shortens in accordance with decreasing well-width.

In order to realize intersubband transition in a near infrared region, E2' is required to be lower than the energy level of a barrier since both of quantum levels E1' and E2' increase with decreasing well-width. Therefore, in order to realize intersubband transition in 1.55 µm, a wavelength used in optical communication, a materials of very large interband discontinuity for enabling a very high barrier level are required, making it difficult to realize the intersubband transition.

Yoshida et al. proposed a method in which shortening of intersubband transition wavelength to the wavelength band of optical communication and high-speed, non-linear transition were realized consistently utilizing split levels of a coupled quantum well where two or more quantum wells were coupled. The intersubband wavelength was shortened to 1.55 µm by strengthening coupling between quantum wells in the coupled quantum well using an InGaAs well layer, an AlAsSb coupling barrier layer, and an AlAsSb outer barrier layer (see Patent Reference 1 and Non-Patent Reference 2).

On the other hand, where an optical switch is fabricated using an optical absorption by an intersubband transition of a quantum well, it is necessary to dope the quantum well with high concentration impurities such as Si in order to generate carriers. For example, in the materials using InGaAs well layer and AlAsSb outer barrier layer as shown in the below described Patent Reference 2 and Non-Patent Reference 1, mutual diffusion of constituent atoms of the quantum well was generated by high concentration doping of Si atoms, thereby disturbing the flatness of hetero-boundaries. Proposed solutions for such problems include improvement of flatness of hetero-boundaries by inserting AlAs diffusion inhibiting layer between the InGaAs well layer and the AlAsSb outer barrier layer, and an use of AlAs layer as a coupling barrier layer alternative to the AlAsSb layer. As a result, a satisfactory absorption by intersubband transition is observed (see Patent Reference 2 and Non-Patent Reference 3).

However, in the above-described coupled quantum well structure (FIG. 4), in order to shorten the intersubband transition wavelength to 1.55 µm by strengthening the coupling between quantum wells, it was required to decrease the AlAsSb or AlAs coupling barrier layer to 4 atomic layers and to decrease the InGaAs well layer to 2 nm. Due to the constraint on semiconductor crystal growth technology, film thickness of constituent layers of a quantum well cannot be decreased over a lower limit. In addition, considering the yield of mass production, further reduction of film thickness of the coupling barrier layer, well layer or the like are not desirable. To control more broad wavelength of intersubband transition, it is necessary to further strengthen the coupling between quantum wells.

On the other hand, Tsuchida et al. recently found an ultra-high speed all-optical phase modulation effect. Where the electrons in a subband are excited by irradiating pump light of TM polarization wave to an optical waveguide that uses an InGaAs/AlAsSb coupled quantum well structure as a core layer, modulation of phase occurs in a probe light of TE polarization wave in which a subband absorption does not occur. By a combination of this phase modulation effect and a Mach-Zehnder interferometer, all-optical DEMUX operation of 160 GHz was realized with a low energy optical input of 7pJ. For further reduction of operation energy, it is effective to enhance the phase modulation effect (see Non-Patent References 4 and 5).

On the other hand, Ishikawa et al. made clear that the above-described phase modulation effect was caused by a huge change in a refractive index caused by aparabolic (non-parabolic) E-k relation in the quantum well and 2 dimension plasma effect of high concentration carriers. Based on this result, it is estimated that a strengthening of the coupling between quantum wells is an effective way to enhance a phase modulation effect (see Non-Patent References 6 and 7).

Non-Patent Reference 1: Naruse et al., IEEE Photon. Technol. Lett., 17, (2005) 1701.

Non-Patent Reference 2: Yoshida et al., IEICE Tans. Electron., E87-C, (2004) 1134-1141.

Non-Patent Reference 3: Mozume et al., Jpn. J. Appl. Phys., 42 (2003) 5500.

Non-Patent Reference 4: Tsuchida et al., Opt. Lett., 32 (2007) 751.

Non-Patent Reference 5: Akimoto et al., Proceeding of 2007 International Conference on ECOC, to be published.

Non-Patent Reference 6: Ishikawa et al., Jpn. J. Appl. Phys., vol. 46, pp. L157-L160, 2007.

Non-Patent Reference 7: Nagase et al., Proceedings of 2007 International Conference on IPRM, 2007 p. 502.

Patent Reference 1: Japanese Unexamined Patent Application, First Publication, No. 2000-89270.

Patent Reference 2: Japanese Unexamined Patent Application, First Publication, No. 2003-329988.

DISCLOSURE OF INVENTION

Problems to be Solved by the Invention

As described above, in order to shorten the wavelength of an optical switch utilizing intersubband transition of coupled quantum well and reduce the operation energy by enhancing the phase modulation effect, it is necessary to strengthen the coupling between quantum wells. Although reduction of film thickness of a coupling barrier layer may be used as a method of strengthening the coupling, further reduction of film thickness is difficult due to constraints on a crystal-growth technology and is not desirable considering mass production and yields.

Based on the consideration of the above-described circumstances, an object of the present invention is to realize a coupled quantum well structure of high coupling strength which is important for shortening the wavelength of an optical switch utilizing intersubband transition and for reducing operation energy by an enhancement of phase modulation effect. Another object of the present invention is to provide a coupled quantum well structure excellent in productivity by avoiding film thinning of a coupling barrier layer, a conventional way to enhance the coupling strength.

Means for Solving the Problem

In order to solve the above-described problems, the present invention comprises the below-described constitutions.

In accordance with the present invention, a coupled well structure comprising a coupling barrier layer 16 having an energy barrier lower than an outer barrier layer 13

Figure 5:
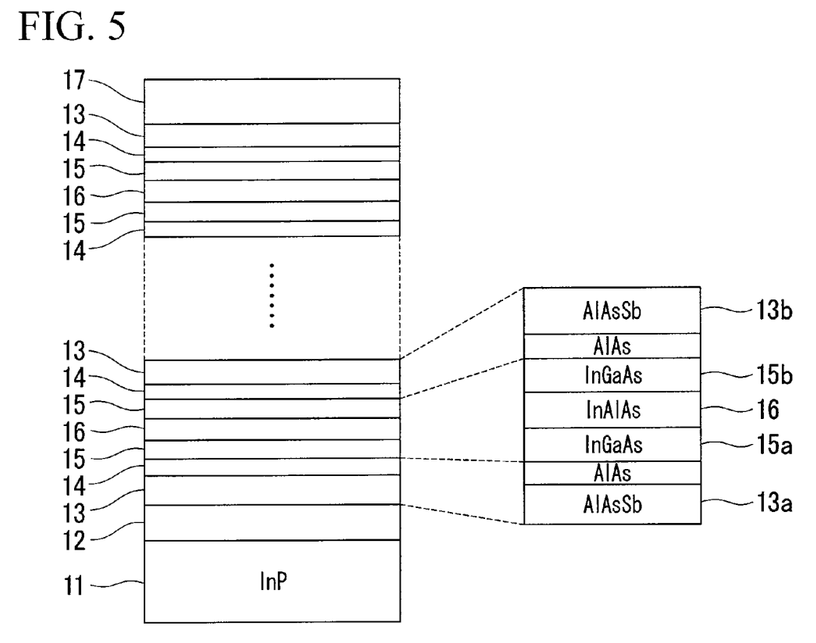
FIG. 5 is a graph showing a basic configuration of a coupled quantum well structure according to the present invention.

An optical device utilizing an intersubband transition according to the present invention comprises a coupled well structure disposed on a semiconductor substrate 11 such as InP, wherein the coupled well structure includes a coupling barrier layer 16 disposed between quantum well layers 15a, 15b, and the coupling barrier layer 16 has an energy barrier lower than an outer barrier layer 13 (FIG. 5).

Preferred embodiments of the present invention include following aspects.

(1) A single crystal substrate is a substrate such as sapphire substrate that allows forming a quantum well thereon.

(2) It is preferable to control the height of an energy barrier to be as low as possible.

The height of the energy barrier may be lower than the quantum level utilized in an intersubband transition.

(3) The quantum well layer may be made of InGaAs or a GaAs. The coupling barrier layer may be made of InAlAs, AlAs, AlAsSb, AlGaAs, or InGaAlAs. The outer barrier layer may be made of AlAs, AlAsSb, or AlGaAsSb.

(4) In the above described (3), the intersubband energy difference of all subbands in a conduction band is not lower than 36 meV.

(5) The quantum well layer may be made of GaN or InGaN, and the coupling barrier layer may be made of AlN or AlGaN.

(6) In the above described (5), intersubband energy difference of all subbands in a conduction band is not lower than 88 meV.

Figure 4:
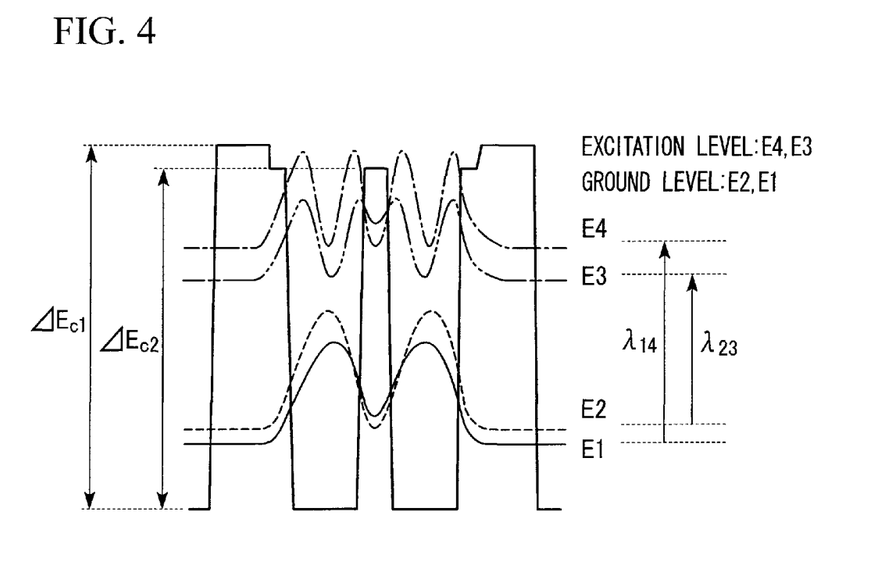
FIG. 4 is a graph showing an energy band structure of a conduction band of a conventional coupled double quantum well.

Conventionally, thinning of a coupling barrier layer has been used as a method of strengthening a coupling between quantum wells in a coupled well structure as shown in FIG. 4. When two quantum wells each having two subbands are coupled, four subbands ($E_1$, $E_2$, $E_3$, $E_4$) are obtained. Intersubband transition wavelength depends on the thickness of the coupling barrier layer. Shortening of the wavelength ($\lambda_{1-4}$) of intersubband transition by $E_1$-$E_4$ transition is enabled by decreasing the layer thickness of the coupling barrier layer (see the dashed line in FIG. 6).

However, such a strengthening of the coupled quantum well structure by thinning the thickness of the coupling barrier layer is restricted by the constraint on the crystal growth technologies. In addition, broadening of the intersubband absorption spectrum by a fluctuation of the thickness of the quantum well layers and the coupling barrier layer tends to be easily affected by decreasing the film thickness. The broadening of the absorption spectrum decreases the absorption coefficient in the wavelength of the peak of the absorption spectrum, thereby inhibiting low energy operation of the optical switch.

Figure 1:
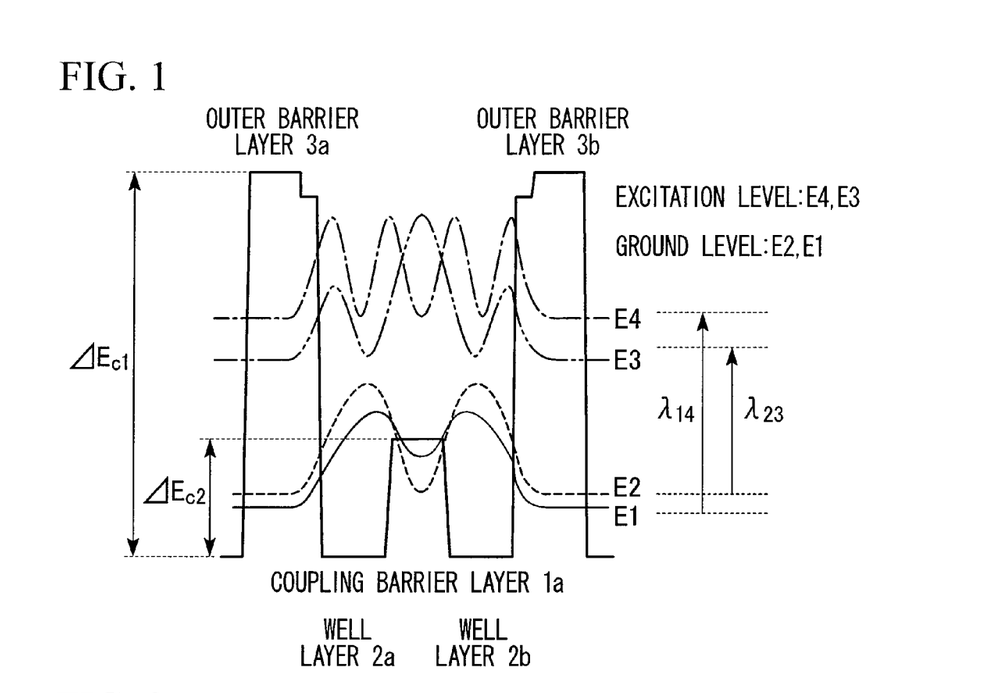
FIG. 1 is a graph showing an energy band structure of a conduction band of coupled quantum well structure according to the present invention.

As a quantum well structure capable of solving the above-described problem and enhancing the coupling between quantum wells, the inventors invented a coupled quantum well structure as shown in FIG. 1. In the coupled quantum well structure, a barrier layer of relatively low energy barrier is used as a coupling barrier layer.

Figure 6:
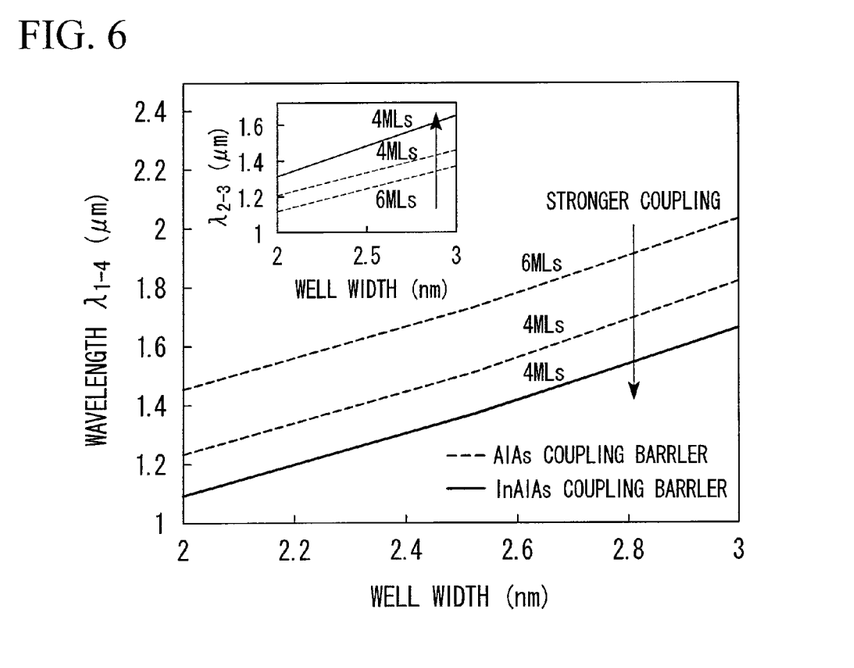
FIG. 6 is a graph showing a coupling barrier-width dependence of a coupled quantum well structure.

By this constitution, it is possible to enhance the coupling between quantum wells even when the coupling barrier layer is thickened. The strength of coupling depends on the height ($\Delta E_{c2}$) and width ($C_b$) of the coupling barrier layer and the effective mass of electrons in the coupling barrier layer. Reflection of an electron wave to the coupling barrier layer at an energy higher than the energy barrier ($\Delta E_{c2}$) of the coupling barrier layer is a specific phenomenon of quantum mechanics. FIG. 6 shows a dependence of intersubband transition wavelength on the thickness of coupling quantum well layer in the coupled quantum well constituted of an InGaAs well layers, a AlAsSb barrier layer, and an InAlAs coupling barrier layer. It is possible to identify that the intersubband transition wavelength changes in accordance with the width of the coupling barrier layer even when an InAlAs coupling barrier layer having an energy barrier lower than the excitation level ($E_4$ and $E_3$) is used.

Figure 7:
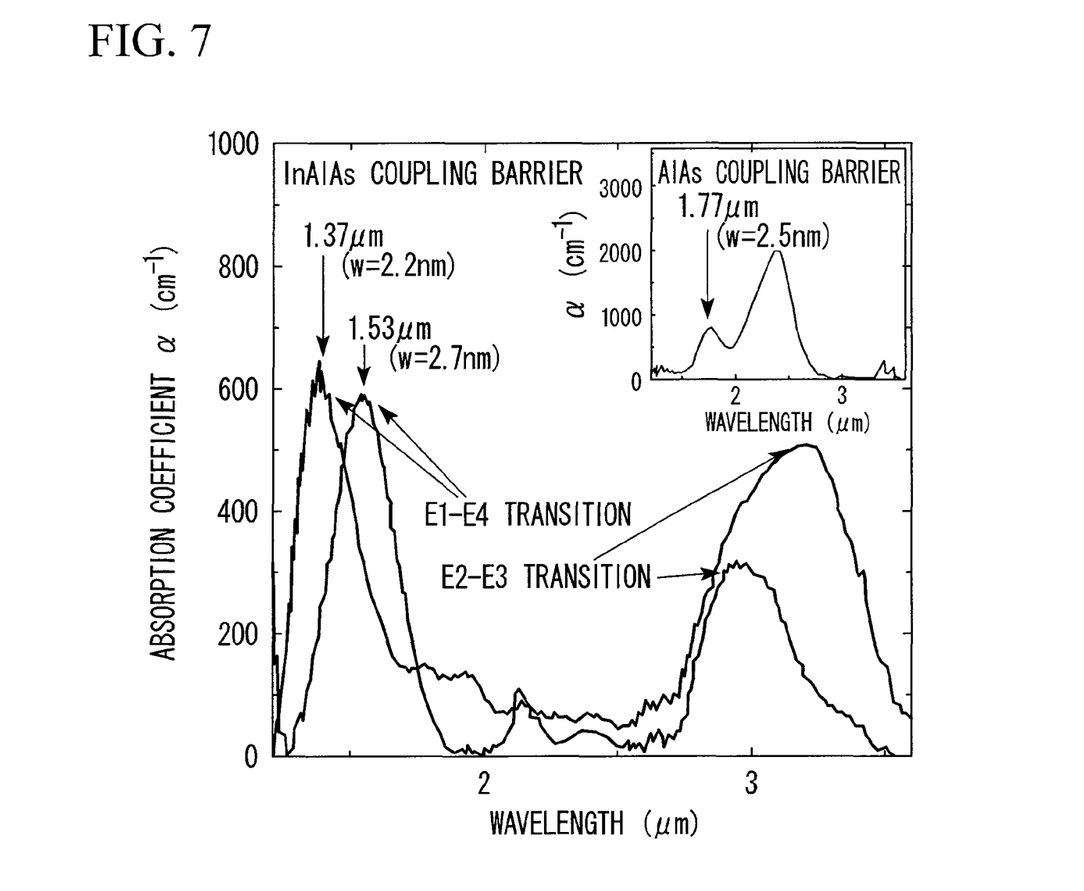
FIG. 7 is a graph for comparing intersubband optical absorption spectrums in coupled quantum wells having different coupling barrier layers.

FIG. 7 shows comparative results of measurement of absorption spectrum by intersubband transition in coupled quantum wells constituted of InGaAs quantum wells, an AlAsSb outer barrier layer, and an AlAs diffusion barrier layer, where the coupling barrier layer was selected from an AlAs layer and an InAlAs layer. Absorption peaks are measured in two wavelengths in the absorption spectrum. The absorption peak of 2 μm or less in wavelength is caused by $E_4$-$E_1$ intersubband transition. An absorption peak of 2 μm or more in wavelength is caused by $E_3$-$E_2$ intersubband transition. It was confirmed that the wavelength of intersubband transition ($E_4$-$E_1$ transition) was shortened to 1.37 μm in a well-width (w) of 2.2 nm by the use of InAlAs layer having a low energy barrier. In addition, it was found that a well-width (w) could be increased to 2.7 nm so as to obtain an intersubband transition ($E_4$-$E_1$ transition) in a wave length of 1.53 μm, that is, a wavelength of optical communication. On the other hand, in the conventional case of using AlAs layer (the inserted graph in FIG. 7), the wavelength of the intersubband transition ($E_4$-$E_1$ transition) is 1.77 μm in a well-width (w) of 2.5 nm, and a further decrease of well-width is required for obtaining an intersubband transition of 1.55 μm. This result shows a benefit of the use of lower energy barrier ($\Delta E_{c2}$) in shortening of intersubband transition wavelength, that is, in strengthening the coupling. In addition, it has been confirmed that an absorption spectrum of narrower width could be obtained in the case of using an InAlAs layer compared with the case of using a conventional AlAs layer.

On the other hand, change of refractive index in the effect of phase modulation to the TE probe light by TM pump light can be expected to be combined with a Mach-Zehnder Interferometer to realize an ultra-high speed optical switch, combined with a DFB structure to realize a wavelength selective switch or a bistable operation. To realize the above-described utilities, it is important to realize a low-energy operation, and enhancement of a phase modulation effect.

The phase modulation effect can be explained by an aparabolic E-k relation of a quantum well and a change $\Delta n$ of refractive index generated by a plasma effect of high concentration carriers and is expressed by the below-described formula.

$$\Delta n = -\sum_{i=1}^{4} \frac{e^2 N_{s,i} q}{4\varepsilon_0 \omega^2 m_i^*} \quad \text{Formula 1}$$

where $m_i$ (i=1, 2, 3, 4) and $N_{s,i}$ denote an effective mass of an electron in a quantum level $E_i$ (i=1, 2, 3, 4) and sheet carrier density, e is an elementary charge of an electron, $\varepsilon_0$ is a dielectric constant in a vacuum, ω is an angular frequency of an electron, and q is a wavenumber of an electromagnetic wave.

Figure 8:
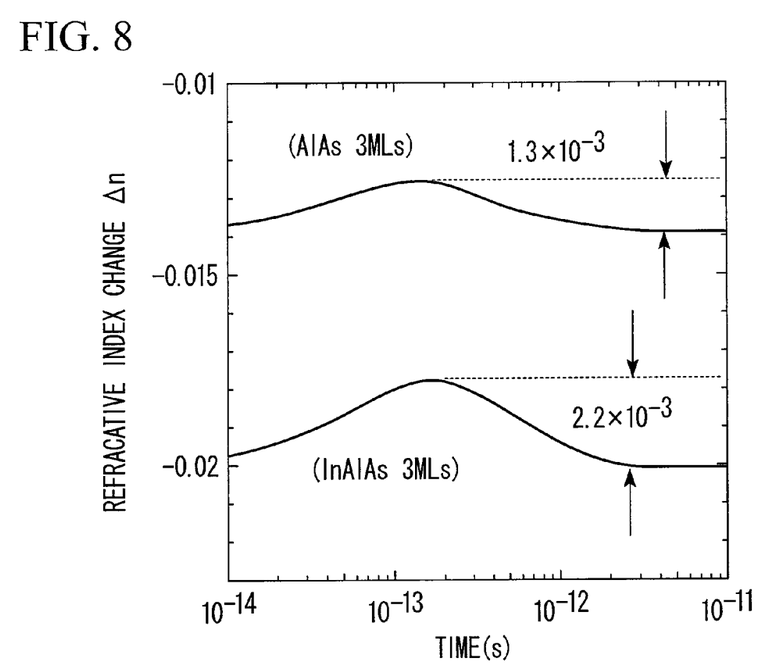
FIG. 8 is a graph showing a change of refractive index by excitation of subband by TM polarization light.

FIG. 8 shows comparative results of change $\Delta n$ of refractive index for the case of using AlAs and the case of using InAlAs as a coupling barrier layer in an InGaAs/AlAsSb coupled quantum well structure. Concentration of doping in the quantum well was controlled to be $1\times10^{19}$(cm$^{-3}$). It was confirmed that $\Delta n$ increased by decreasing barrier energy $\Delta E_{c2}$ of the coupling barrier, thereby enhancing the coupling.

This can be explained mainly based on the below described three effect. Firstly, by strong coupling, quantum level energy $E_i$ (i=1, 2, 3, 4) is decreased. A first effect is caused by a decrease in $m_i$ (i=1, 2, 3, 4) in accordance with the reduction of quantum level energy $E_i$ (i=1, 2, 3, 4) by strong coupling. The second effect is caused by a decrease of sheet carrier density $N_{s,2}$ and increase of sheet carrier density $N_{s,1}$ due to the increase in split of quantum level and increase of energy level of $E_2$. The third effect is caused by an increase in sheet carrier density by an increase of well-width due to coupling enhancement.

In a InGaAs/AlAsSb quantum structure, a band-gap may be controlled by controlling the In composition or the like. Since the decrease in band-gap enhances aparabolic property of quantum wells, it is possible to further enhance the above-described effect.

Figure 9:
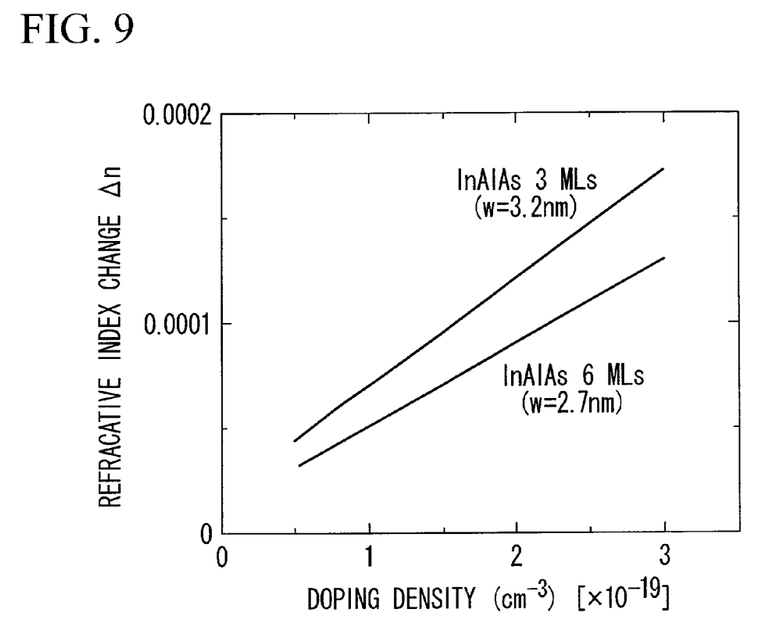
FIG. 9 is a graph showing a change of refractive index depending on doping.

In addition, as shown in FIG. 9, an increase of doping concentration in the quantum wells totally increases the amount of $N_{s,i}$ in the equation (1). Therefore, it is effective for enhancement of a phase modulation effect.

Figure 10:
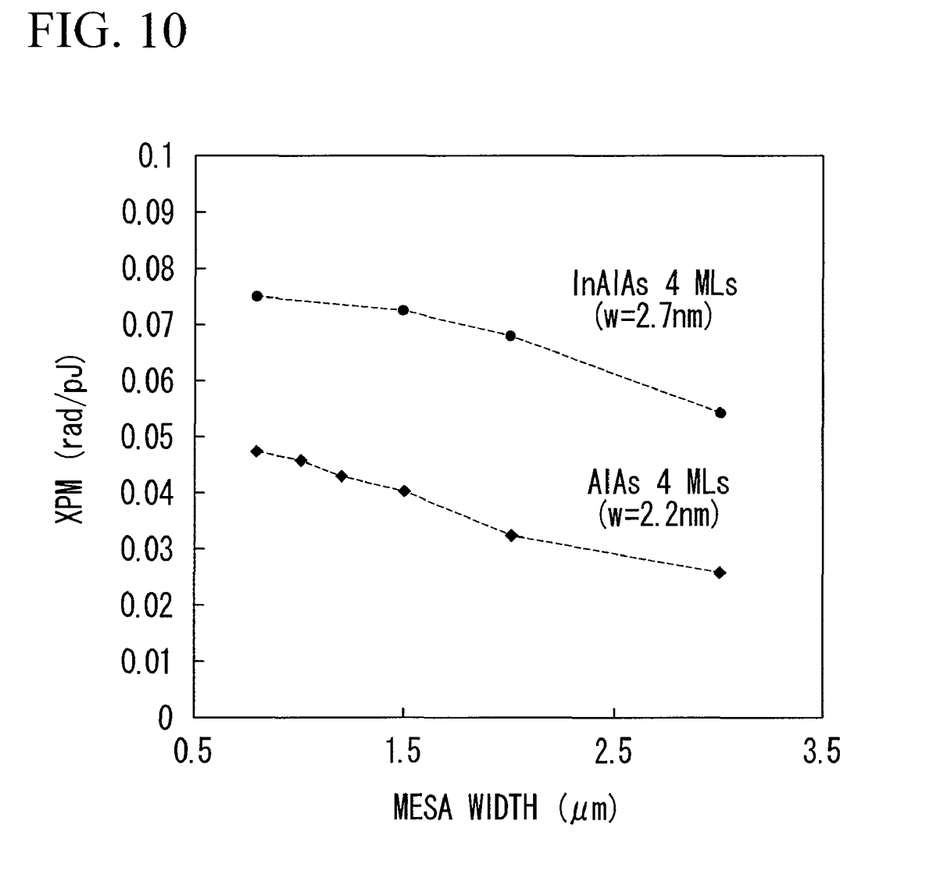
FIG. 10 is a graph showing the result of measurement of phase shifting caused by a change of refractive index.

FIG. 10 shows a result of measurement of phase shifting of TE generated when the waveguide (mesa width 0.8 μm) having the coupled quantum well structure as the core layer was excited by TM light. The phase shifting was 0.474 pJ/rad when the AlAs barrier layer was used. On the other hand, the phase shifting was 0.751 pJ/rad when the InAlAs barrier layer was used. It was confirmed that the phase shifting was equivalent to the ratio of change of a refractive index theoretically estimated from FIG. 8.

Strengthening coupling between quantum wells is enhanced as the height of the energy barrier of the coupling barrier layer in the coupled quantum well was lowered. On the other hand, when the energy barrier of coupling barrier layer is lowered, optical dipole moment is decreased and optical absorption coefficient is decreased because of the following reason. Wave function is changed when the coupling strength is enhanced. Especially, where overlap of ground level and excitation level is decreased and the coupling barrier layer is absent, the dipole moment has very small value. That is, it is impossible to achieve sufficient optical absorption caused by the intersubband transition between the first level and the fourth level in a single quantum well having no coupling barrier, and having wide width quantum layer.

In a coupled quantum well, by designing the structure such that intersubband energy difference of all the case is larger than a longitudinal optical (LO) phonon energy (36 meV or more in InGaAs system and GaAs system, and 88 meV or more in InGaN system and GaN system), it is possible to enhance the speed of absorption recovery in the case of using the coupled quantum well in an all-optical switch or the like. The absorption recovery speed is determined by $E_4$-$E_3$ and $E_2$-$E_1$ energy differences (see the above described non-patent reference 2). This energy difference can be controlled by the energy height and thickness of the coupling barrier. Where an intersubband transition between $E_1$ and $E_4$ of a single quantum well is used, controllability of energy difference between quantum levels is deteriorated. In this meaning, the presence of a coupling barrier layer has an important meaning.

EFFECT OF THE INVENTION

As described above, according to the present invention, by reducing, to as low a level as possible, the energy barrier $\Delta E_{c2}$ of the coupling barrier interposed between two or more quantum well layers in a coupled quantum well structure for intersubband transition, it is possible to produce a coupled quantum well structure having strong coupling between quantum wells and excellent productivity.

BEST MODE FOR CARRYING OUT THE INVENTION

In the following, a preferred mode for carrying out the present invention is explained.

EXAMPLE 1

FIG. 5 is a schematic drawing showing a basic configuration of a coupling barrier structure according to an embodiment of the present invention. The coupled quantum well structure formed on a semiconductor substrate 11 includes two quantum well layers 15 (15a, 15b), a coupling barrier layer 16 interposed between the well layers 15, and outer barrier layers 13 (13a, 13b) on both sides of the well layers 15. One or more of these quantum well structures are formed on the substrate. A buffer layer 12 constituted of InP, InAlAs, AlAsSb or the like and a clad layer 17 are formed on both sides of the coupled quantum well structure.

Each layer of 12, 13, 14, 15, 16, and 17 is constituted of a compound semiconductor, and is formed, for example, by continuous growing in accordance with a growth method such as a MBE method and a MOCVD method. An energy band of a conduction band of the coupled quantum well structure has a state as shown in FIG. 1. $\Delta E_{c1}$ denotes a band-offset between the quantum well (2a and 2b) and the outer barrier layer (3a and 3b), and $\Delta E_{c2}$ denotes a band-offset between the quantum well (2a and 2b) and the coupling barrier layer (1). In order to achieve a strong coupling state, $\Delta E_{c2}$ is set lower than the excitation level ($E_4$ or $E_3$). In order to prevent reduction of the transition dipole, $\Delta E_{c2}$ is set larger than the ground level ($E_2$ or $E_1$). Here $E_1$, $E_2$, $E_3$, and $E_4$ denote quantum levels of subbands of a conduction band.

In such a configuration, quantum well layer 2a, 2b are doped with n-type impurities. Electrons are accumulated in subbands (mainly the first, and the second subband) of lower level. By irradiating light to this configuration, the electrons are excited from the subbands of lower level to the subbands of higher level, and intersubband optical absorption is generated. In this time, intersubband optical absorption spectrum having an absorption peak corresponding to an allowable intersubband transition, for example, $E_1$-$E_2$, $E_2$-$E_3$, and $E_1$-$E_4$ transition is obtained.

The absorption peak corresponding to the allowable transition, such as $E_1$-$E_2$, $E_2$-$E_3$, $E_1$-$E_4$ intersubband transition or the like changes in accordance with the species and thickness of constituent layers such as well layers and coupling barrier layer of the quantum well. When the well layer is thinned, since all quantum levels shift to higher energies, sufficiently high outer barrier layer is required to have sufficiently high energy barrier. On the other hand, when the coupling barrier layer is thinned and the energy barrier is lowered, $E_1$ and $E_3$ shift to lower energies whereas $E_2$ and $E_4$ shift to higher energies. Thus, thinning of the coupling barrier layer and the lowering of the energy barrier layer enables wavelength shortening of $E_1$-$E_4$ intersubband transition, and makes it easy to control the wavelength in the optical communication band.

Alteration of material is an effective method of reducing the energy barrier of the coupling barrier layer. For example, in an InGaAs/AlAsSb coupled quantum well, it is possible to use an InAlAs layer, an InGaAlAs layer, an AlAsSb layer or the like as the coupling barrier layer and lower the coupling barrier by changing the III group element composition ratio and the group element composition ratio. In a GaAs/AlAs based coupled quantum well, it is possible to reduce the energy barrier by using an InAlAs layer, a AlGaAs layer or the like as the coupling barrier layer. Where the band-gap is also controlled, a change in composition of the well layer is required. A strain that accompanies the compositional change can be compensated for by controlling the composition ratio of group elements of the coupling barrier layer.

The above-described intersubband transition absorption realizes high speed change of optical absorption coefficient and refractive index. The change of optical absorption coefficient is effective in a high speed all-optical switch that utilizes only an intersubbannd transition or both of the intersubband transition and interband transition of the high speed all-optical switch. In addition, change of refractive index, for example, a phase modulation effect on a TE probe light by TM pump light may be combined with a Mach-Zehnder interferometer to realize an all-optical switch, or may be combined with a waveguide having a DFB structure to realize a wavelength selective switch or a bi-stable operation.

Next, an example of a more specific configuration of a coupled quantum well structure of the present embodiment is explained. FIG. 5 shows a coupled quantum well structure of this configuration. The semiconductor substrate 11 is a semi-insulating InP. Each layer is grown on the AlAsSb buffer layer 12 formed on the substrate 11. The quantum well layer 15a and 15b that constitutes a coupled quantum well structure is an n-type $In_{0.53}Ga_{0.47}As$ having a carrier concentration of about $1 \times 10^{19}$ cm$^{-3}$. The well width ranges from 2.2 nm to 2.7 nm. The coupling barrier layer 16 between the well layers 15a and 15b is a non-doped InAlAs having a width of about 1.1 nm.

In this time, as shown in FIG. 7, compared to the case where a conventional AlAs was used as a coupling barrier layer, in the case where a low energy barrier of InAlAs was used as a coupling barrier layer, wavelength of peak absorption spectrum of intersubband transition between $E_2$ and $E_4$ shift to the longer wavelengths, and the wavelength of peak absorption spectrum by the transition between $E_1$ and $E_4$ is shortened relatively easily. Where the well-width and the coupling barrier layer were 2.7 nm and 4 MLs respectively, the absorption coefficient at 1.55 μm was 600 cm$^{-1}$ or more, which is a sufficient value to be applied to an all-optical switch or the like. In addition, an optimum design of this value can be obtained, for example, by increasing the doping concentration in the quantum well layer.

As described above, according to the present embodiment, by providing a coupled quantum well structure having a coupling barrier layer 1a of an energy barrier lower than that of outer barrier layers (3a, 3b) between two or more quantum well layers 2a and 2b on a compound semiconductor substrate such as InP or the like, it is possible to shorten the wavelength of an intersubband transition using a relatively wide thickness of the quantum well layers.

The present invention is not limited to the above-described embodiment. While two quantum well layers have the same well-width in the above-described embodiment, the coupled quantum well structure may be constituted to have three or more quantum wells having different well-widths as long as the dipole moment has an appropriate value.

Materials of the above-described substrate, a quantum well layer, and a coupling barrier layer or the like may be modified in accordance with a technical specification. For example, where a GaAs is used as the quantum well layer, not only InAlAs but also AlGaAs, InAlGaAs or the like could be uses as the coupling barrier layer. Where GaN or InGaN is used as the quantum well layer, it is possible to use AlN or AlGaN as the coupling barrier layer. Although the present embodiment was explained with reference to the quantum well structure of a semiconductor material, it is possible to apply the invention to a quantum structure utilizing oxide material or the like.

INDUSTRIAL APPLICABILITY

A coupled quantum well structure of the present invention may be applied to a high-speed optical switch that utilizes a change of refractive index by intersubband and interband light absorption using a intersubband transition in the conduction band. For example, since the refractive index can be effectively increased by strengthening coupling between quantum wells, the present invention may be utilized in low energy operation of a Mach-Zehnder interference type all-optical switch. The present invention may be combined with DFB structure to realize a wave-length selective switch, and may be utilized in reduction of its operation energy.

What is claimed is:

1. A semiconductor coupled quantum structure, comprising:
   at least a coupled quantum well structure disposed on a substrate,
   wherein a coupling barrier layer disposed between quantum well layers has a band-offset ($\Delta E_{c1}$) that is smaller than band-offsets ($\Delta E_{c2}$) of the quantum well layers and outer barrier layers, the smaller band-offset ($\Delta E_{c2}$) is smaller than one selected from a plurality of excitation levels ($E_4$ and $E_3$), and is larger than one ground level selected from a plurality of ground levels ($E_2$ and $B_1$),
   wherein the quantum well layers comprise InGaAs; the coupling barrier layer comprises InAlAs or InAlGaAs; the outer barrier layer comprises AlAsSb; and all of the intersubband energy differences in the conduction band of the coupled quantum well structure is 36 meV or more.

2. An optical device that utilizes the semiconductor coupled quantum structure according to claim 1, wherein a control light input in the coupled quantum structure resonates one intersubband transition energy, and a signal light input in the coupled quantum structure resonates the intersubband transition energy or interband transition energy.

3. An optical device that utilizes the semiconductor coupled quantum structure according to claim 1, wherein a control light input in the coupled quantum structure resonates one intersubband transition energy, and a signal light input in the coupled quantum structure is subjected to control of phase or wavelength in accordance with change of the refractive index.

4. A semiconductor coupled quantum structure, comprising:
   at least a coupled quantum well structure disposed on a substrate,
   where a coupling barrier layer disposed between quantum well layers has a band-offset ($\Delta E_{c1}$) that is smaller than band-offsets ($\Delta E_{c2}$) of the quantum well layer and outer barrier layers, the smaller band offset ($\Delta E_{c2}$) is smaller than one selected from a plurality of excitation levels ($E_4$ and $E_3$), and is larger than one ground level selected from a plurality of ground levels ($E_2$ and $E_1$),
   wherein the quantum well layer comprises GaN; the coupling barrier layer comprises AlN or AlGaN; the outer barrier layer comprises AlN, and all of the intersubband energy differences in the conduction band of the coupled quantum well structure is 88 meV or more.

5. An optical device that utilizes the semiconductor coupled quantum structure according to claim 4, wherein a control light input in the coupled quantum structure resonates one intersubband transition energy, and a signal light input in the coupled quantum structure resonates the intersubband transition energy or interband transition energy.

6. An optical device that utilizes the semiconductor coupled quantum structure according to claim 4, wherein a control light input in the coupled quantum structure resonates one intersubband transition energy, and a signal light input in the coupled quantum structure is subjected to control of phase or wavelength in accordance with change of the refractive index.

* * * * *